(12) United States Patent
Daggett

(10) Patent No.: US 7,197,012 B2
(45) Date of Patent: Mar. 27, 2007

(54) SYSTEM AND METHOD FOR EXTENDING PERFORMANCE DATA COLLECTION FOR A NETWORK

(75) Inventor: Jeremy Daggett, Roseville, CA (US)

(73) Assignee: Hewlett-Packard Development, L.P., Houston, TX (US)

( * ) Notice: Subject to any disclaimer, the term of this patent is extended or adjusted under 35 U.S.C. 154(b) by 1100 days.

(21) Appl. No.: 10/284,346

(22) Filed: Oct. 31, 2002

(65) Prior Publication Data

US 2004/0085907 A1    May 6, 2004

(51) Int. Cl.
*H04J 1/16* (2006.01)
*H04J 3/14* (2006.01)

(52) U.S. Cl. ..................... 370/252; 711/100

(58) Field of Classification Search .......... 370/389, 370/400, 465, 252, 401; 711/4, 100; 709/212, 709/217–219
See application file for complete search history.

(56) References Cited

U.S. PATENT DOCUMENTS

| | | | |
|---|---|---|---|
| 2002/0166005 A1* | 11/2002 | Errico | 710/38 |
| 2003/0037187 A1* | 2/2003 | Hinton et al. | 710/1 |
| 2003/0158920 A1* | 8/2003 | Lynch et al. | 709/220 |
| 2004/0158656 A1* | 8/2004 | Fujibayashi et al. | 710/38 |
| 2006/0190696 A1* | 8/2006 | Ito et al. | 711/163 |

* cited by examiner

*Primary Examiner*—Ajit Patel

(57) ABSTRACT

A system and method for extending performance data collection for a network are disclosed. The system includes one or more devices corresponding to one or more device types. The system also includes one or more data sources corresponding to the devices, where the data sources are capable of performance data collection from the devices. An abstract data module includes an interface and an abstract class and is operably connected with the data sources. The system includes a data collector that is capable of performance data collection from the data sources using the abstract data module.

12 Claims, 3 Drawing Sheets

SYSTEM AND METHOD FOR EXTENDING PERFORMANCE DATA COLLECTION FOR A NETWORK

TECHNICAL FIELD

The technical field is performance data collection for a network, specifically systems and methods for extending performance data collection for the network.

BACKGROUND

A storage area network (SAN) may be a network of various linked devices including, for example, disk arrays, tape-backup systems and other related devices. SANs may be used to consolidate storage resources in a computer network. Storage consolidation is the concept of centralizing and sharing storage resources among numerous application servers. A primary benefit of storage consolidation is increasing efficiency in managing total storage capacity of the computer network. Management efficiency is increased by centralizing management of all storage resources through a single interface. Additionally, cost savings are achieved through storage consolidation because fewer personnel are required to manage the storage capacity of the computer network. Further, storage capacity utilization may be optimized by allocation of storage capacity to specific application servers as needed.

In order to realize the benefits of storage consolidation, information relating to the storage performance of the devices in the SAN may be collected. The information may be in the form of performance data that may be used to monitor and analyze the storage performance of the devices. The collected information may be used at a central location in order to optimize the overall storage capacity of the computer network, manage unpredictability in storage performance and prepare for upgrade changes to the SAN.

A data collector may be used to collect the performance data for disparate devices in the SAN. Performance data collection in current systems is typically tied to the particular types of devices in the SAN. Three common device types include host devices, data storage devices and interconnect devices. Extending the functionality of the data collector to collect performance data from new types of devices in the SAN would require major changes to the data collector. For example, functional characteristics associated with the new device types must be specifically coded into the data collector, resulting in a significant amount of code duplication in the data collector since devices in the SAN typically share common functional characteristics. Therefore, the current systems and methods involved in extending data collector functionality to include new device types in a SAN are inefficient and redundant.

SUMMARY

A system for extending performance data collection for a network is disclosed. The system includes one or more devices corresponding to one or more device types. The system also includes one or more data sources corresponding to the devices, where the data sources are capable of performance data collection from the devices. An abstract data module includes an interface and an abstract class and is operably connected with the data sources. The system includes a data collector that is capable of performance data collection from the data sources using the abstract data module.

A method for extending performance data collection for a network is also disclosed. The method includes the step of creating one or more data sources for one or more corresponding devices to be implemented into the network, where the devices correspond to one or more device types. The method also includes the step of creating a complete implementation of the data sources. Performance data is then collected for the devices using the complete implementation of the data sources.

DESCRIPTION OF THE DRAWINGS

The detailed description will refer to the following drawings, wherein like numerals refer to like elements, and wherein.

DETAILED DESCRIPTION

Figure 1:
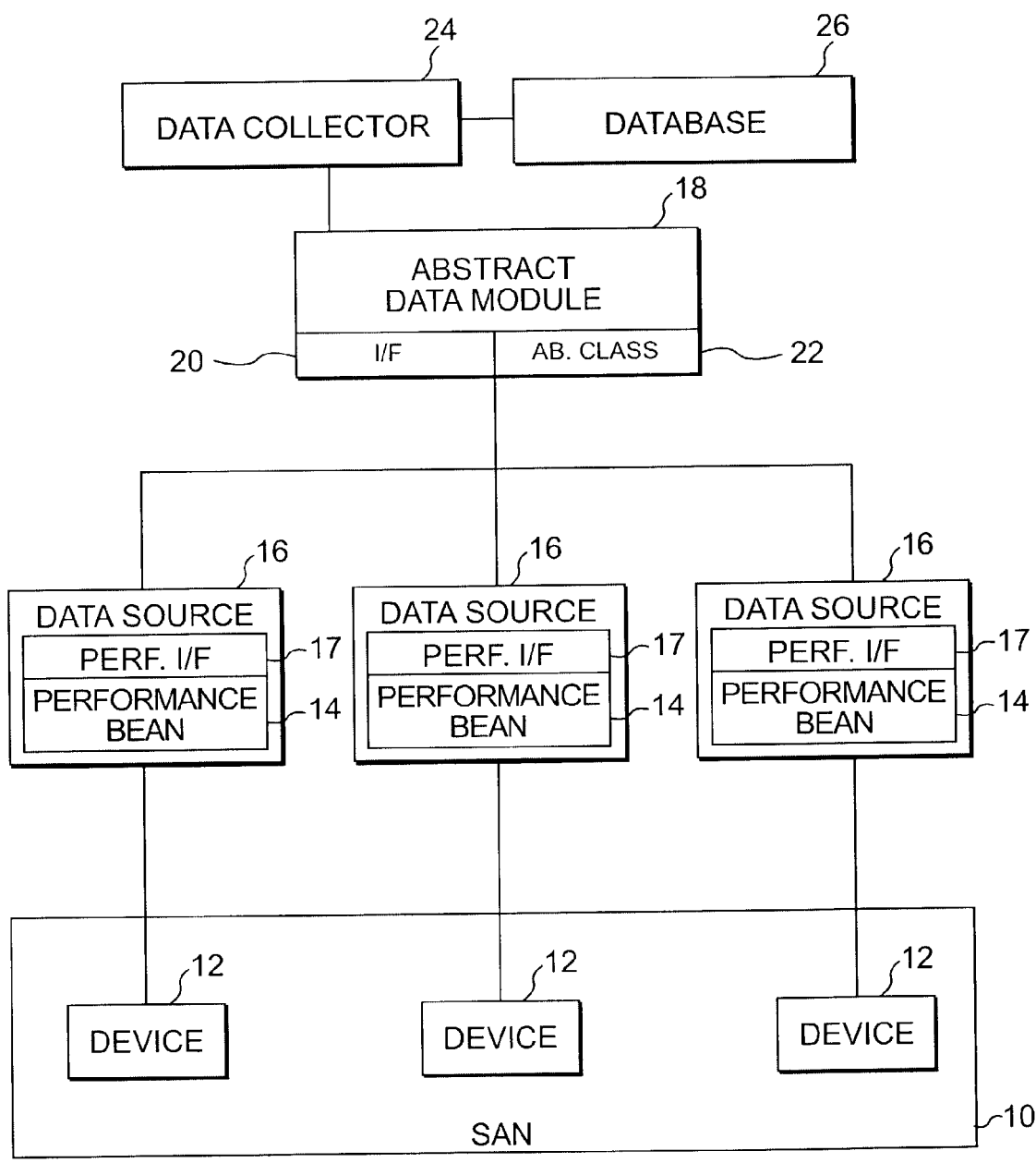
FIG. 1 is schematic diagram of an embodiment of a system for extending performance data collection for a storage area network.

FIG. 1 is a schematic diagram of an embodiment of a system 5 for extending performance data collection for a storage area network (SAN) 10. The SAN 10 may be a network of various linked devices 12 including, for example, workstations, servers, disk arrays, tape-backup systems and other related devices. The devices 12 correspond to one or more associated device types including, for example, host devices, storage devices, interconnect devices, network attached storage devices and host bus adapter devices. Thus, a workstation and a server correspond to host devices and disk arrays correspond to storage devices.

The devices 12 may be connected, for example, by using optical fiber channels, conventional copper land lines or wireless links. Performance data of the devices 12 may be collected in order to monitor, manage and optimize the overall storage performance of the SAN 10. Optimizing the storage performance begins with a data collector 24 that collects performance data from the devices 12. The performance data collection of the data collector 24, which is described below in more detail, is extendible so that the data collector 24 can collect performance data from new device types that may be implemented in the SAN 10. The performance data of the devices 12 may be stored within each respective device 12. For example, the performance data may be stored as records in a database (not shown) contained in the respective devices 12. The data collector 24 may access each database to retrieve desired performance data for the respective device 12.

Each device 12 is coupled to a corresponding data source 16. Each data source 16 may comprise a corresponding performance bean 14 and a performance interface 17. Each data source 16 may include one or more algorithms that implement specific functional characteristics associated with the device type of the corresponding device 12. The specific functional characteristics implemented by the data source 16 are used by the corresponding performance bean 14 to retrieve performance data from the corresponding device 12. For example, a specific functional characteristic may relate to a method for communicating with the device 12. The performance bean 14 may use the method for communicating with the device 12 in order to retrieve performance data from the device 12.

The performance beans 14 may comprise one or more algorithms for retrieving the performance data from the devices 12. The performance beans 14 may retrieve the performance data from the corresponding devices 12 using methods compatible with the communication methods supported by the corresponding devices 12. For example, a storage device 12 may be capable of receiving SCSI commands to retrieve specific performance data from the storage device 12. The corresponding performance bean 14 may send SCSI commands to the storage device 12 to retrieve performance data from the storage device 12. The performance bean 14 may then parse the performance data in a format that is compatible with the corresponding data source 16.

Each performance bean 14 may be constructed using techniques known in object oriented programming, such as, for example, the JavaBeans™ component architecture, which is well known as a method for developing component-based software. Each performance bean 14 includes component-based software that the data collector 24 may use to collect the performance data from the devices 12. Each performance bean 14 includes information on the types of performance data that may be collected by the performance bean 14 and the methods for collecting the performance data from the devices 12. The information is stored in the BeanInfo class for each performance bean 14. Each data source 16 may retrieve the performance data from the corresponding device 12 through the corresponding performance bean 14 using the performance interface 17. The performance bean 14 may function as a conduit for performance data collection from a new device 12 by a new data source 16. To execute the data collection process, the new data source 16 invokes the performance interface 17, which then initiates data collection by the performance bean 14 from the device 12.

The performance interface 17 may comprise one or more algorithms for controlling data collection by the data sources 16. For example, the performance interface 17 may comprise an algorithm for determining the largest, or smallest, time interval at which the corresponding performance bean 14 is to be polled to retrieve performance data from the corresponding device 12. Additionally, the performance interface 17 may comprise an algorithm for resetting the performance data values that may have been previously retrieved and stored by the performance bean 14. The performance interface 17 is used by each of the data sources 16.

The data sources 16 are operably connected to an abstract data module 18. The abstract data module 18 comprises an interface 20 that may use one or more algorithms to interface the data sources 16 with the abstract data module 18. For example, the interface 20 may use algorithms for scheduling data collection, collecting performance data and summarizing collected performance data for one or more data sources 16. All of the data sources 16 may use the interface 20, regardless of the device types associated with the data sources 16.

The abstract data module 18 also comprises an abstract class 22 common to all of the device types in the SAN 10. The abstract class 22 includes one or more algorithms that implement generic functional characteristics associated with the device types corresponding to the devices 12 in the SAN 10. Generic functional characteristics relate to functional characteristics common to all device types associated with the devices 12. Examples of generic functional characteristics include information regarding the correlation of collected performance data to specific devices 12, information regarding how performance data is to be collected, location of storage areas for collected performance data and the specific performance data to be collected.

The interface 20 and the abstract class 22 are compatible with all potential device types associated with devices 12 that are capable of being implemented into the SAN 10. The interface 20 and the abstract class 22 may be directly coded into the abstract data module 18. Alternatively, the interface 20 and the abstract class 22 may exist as separate software modules that may be called by an algorithm in the abstract data module 18.

The abstract data module 18 is operably connected to the data collector 24. To ensure its extendibility, the data collector 24 may include one or more algorithms for creating new data sources 16 and initiating performance data collection through the newly created data sources 16. The data collector 24 may create a new data source 16 and the corresponding performance bean 14 by instantiating new objects for each new data source 16 and corresponding performance bean 14. Methods for instantiating objects are well known in object oriented programming, such as, for example, Java programming. The data collector 24 may also include one or more algorithms for scheduling performance data collection by the new data sources 16.

The data collector 24 is operably connected to a database 26, which stores collected performance data for the devices 12. The performance data may be stored as records of the database 26 and may be accessed by the data collector 24.

The data collector 24 may be implemented in software for execution by computers or other machines. The data collector 24 may be a module or component of software (not shown). The data sources 16, abstract data module 18, performance beans 14, interface 20, abstract class 22 and performance interface 17 may also be implemented as software modules.

Figure 2:
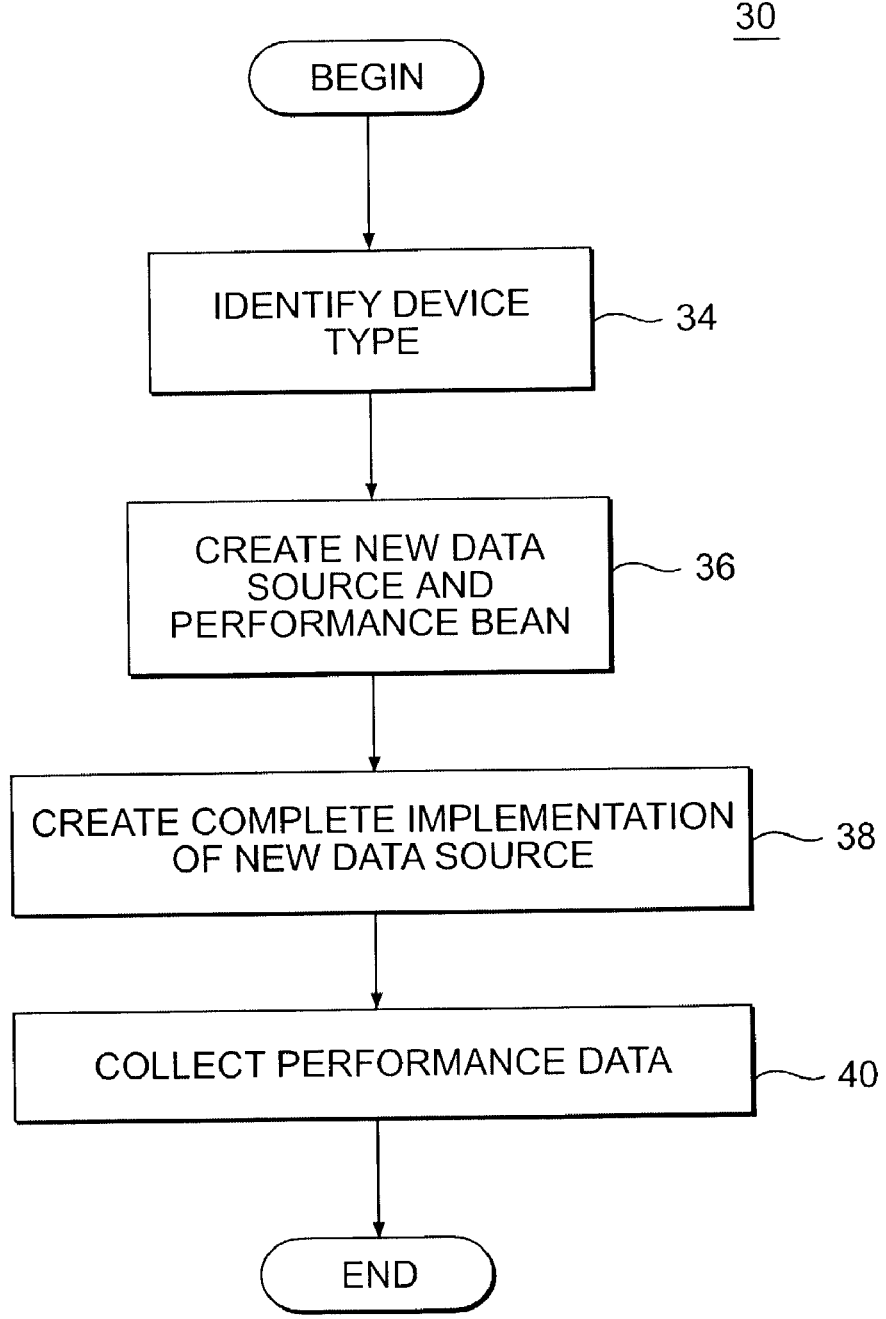
FIG. 2 shows a flow diagram of an embodiment of a method for extending performance data collection for the storage area network.

FIG. 2 shows a flow diagram of an embodiment of a method 30 for extending performance data collection for the SAN 10. In the embodiment shown in FIG. 2, the flow diagram illustrates steps for incorporating a new device 12 of a new device type into the SAN 10 and collecting performance data from the new device 12.

In step 34, the data collector 24 identifies the device type for the new device 12 in order to create the type of data source 16 necessary to collect performance data from the new device 12. The data collector 24 may receive notification from a processing means (not shown) operably coupled to the data collector 24 whenever a new device 12 is to be implemented in the SAN 10. The processing means may be implemented in software for execution by computers or other machines. The processing means may also include one or more suitably programmed general purpose processors, specially programmed processors, or ASICS, for example. The data collector 24 may be notified of new devices 12 by various notifications that correspond to the device types of the new devices 12. Since the notifications correspond to the device types of the new devices 12, the data collector 24 may identify the device type of a new device 12 by the type of notification received from the processor. For example, the data collector 24 may identify the device type of a new host device when a notification corresponding to a host device type is received.

In step 36, the data collector 24 creates a new data source 16 and a corresponding performance bean 14 for the new device type identified in step 34. The type of data source 16 created depends on the device type of the new device 12. For example, if the new device 12 is a Brocade™ switch, then an interconnect data source is created by the data collector 24, since a Brocade™ switch is a type of interconnect device. The new data source 16 is created by implementing specific functional characteristics associated with the device type corresponding to the new device 12. The specific functional characteristics may be implemented by the data collector 24 instantiating an object and coding the specific functional characteristics of the new device type corresponding to the new device 12 directly into the object. Coding the specific functional characteristics into the object may be performed manually by a computer programmer or automatically by an object creation module (not shown). The type of performance bean 14 created also depends on the device type of the new device 12. For example, in the Brocade™ switch example, the interconnect data source creates a Brocade™ switch performance bean.

In step 38, a complete implementation of the new data source 16 is created by the data collector 24 by combining the new data source 16 specific functional characteristics with the generic functional characteristics, which are included in the abstract data module 18. Examples of the generic functional characteristics are provided above. The specific functional characteristics may be combined with the generic functional characteristics by the data collector 24 extending the class associated with the object instantiated for the new data source 16 to include the abstract data module 18. Methods for extending the class of an instantiated object are well known in object oriented programming, such as, for example, Java programming.

As discussed above, the abstract data module 18 includes the abstract class 22, which is common to all device types capable of being implemented in the SAN 10. The abstract class 22 includes one or more algorithms that implement the generic functional characteristics associated with all device types capable of being implemented in the SAN 10. Therefore, by including the abstract class 22, the abstract data module 18 provides a pre-designed, partial implementation of any new data source 16. Consequently, the generic functional characteristics of a new device type do not need to be coded into the new data source 16 when the new data source 16 is created. The complete implementation of the new data source 16 allows the data collector 24 to collect performance data through the new data source 16. The data collector 24 may collect the performance data from the devices 12 at predefined intervals.

In step 40, the data collector 24 collects performance data for the new device 12 using the complete implementation of the new data source 16. Therefore, changes to the data collector 24 are not required when implementing a new device 12 with a new device type into the SAN 10 for performance data collection. Consequently, the inefficiency and the redundancy of code duplication involved in current systems and methods for extending data collector functionality may be avoided. The method 30 then ends.

Figure 3:
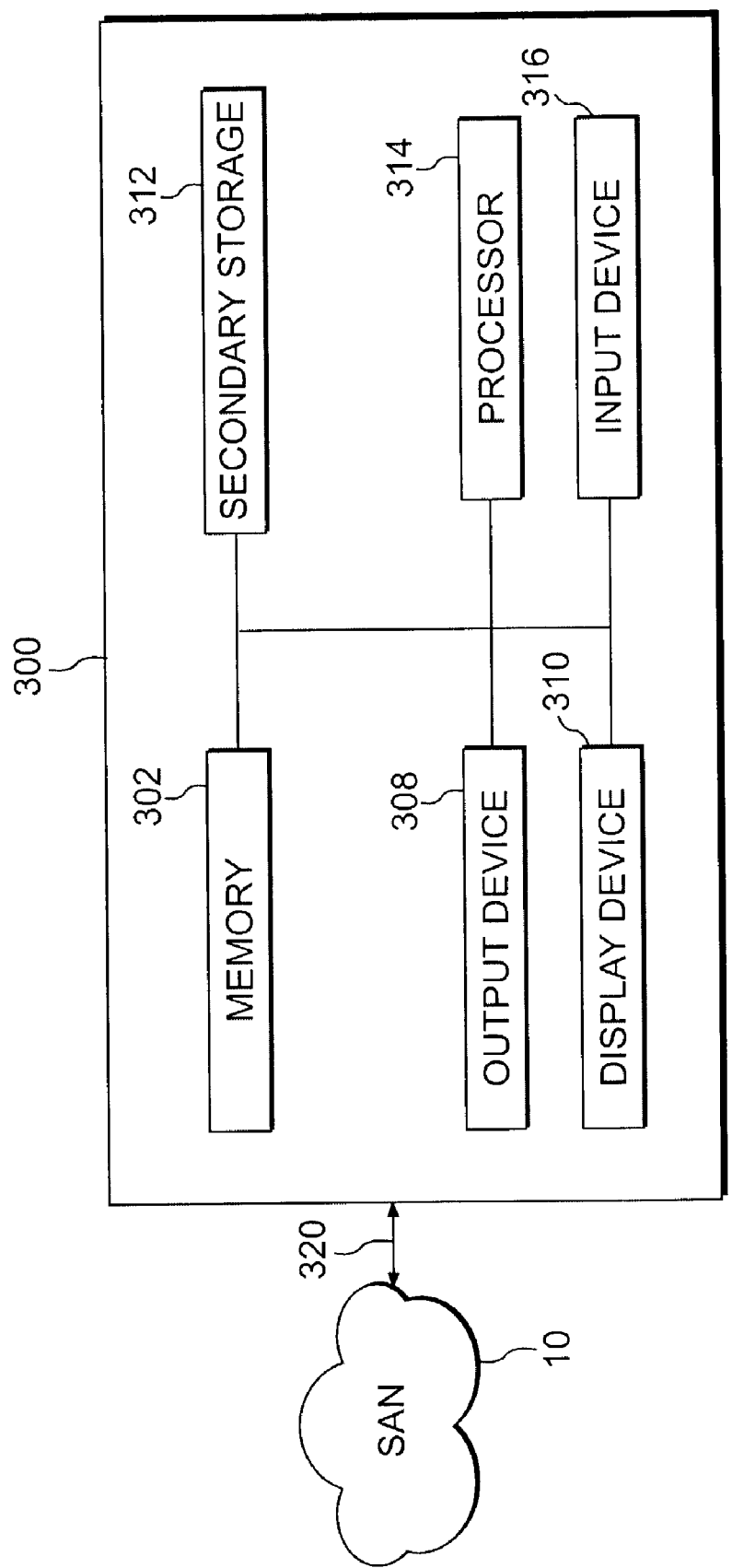
FIG. 3 illustrates exemplary hardware components of a computer that may be used in connection with the method for extending performance data collection for the storage area network.

FIG. 3 illustrates exemplary hardware components of a computer 300 that may be used in connection with the method for extending performance data collection for a SAN 10. The computer 300 includes a connection 320 with the SAN 10 such as the Internet or other type of computer or telephone network. The computer 300 typically includes a memory 302, a secondary storage device 312, the processor 314, an input device 316, a display device 310, and an output device 308.

The memory 302 may include random access memory (RAM) or similar types of memory. The secondary storage device 312 may include a hard disk drive, floppy disk drive, CD-ROM drive, or other types of non-volatile data storage, and may correspond with various databases or other resources. The processor 314 may execute information stored in the memory 302, the secondary storage 312, or received from the Internet or other network. The data collector 24 may be implemented in the processor 314. Instructions for performing a method for extending performance data collection for a SAN 10, such as the method described above, may be stored in the memory 302 or the secondary storage 312. Likewise, the database 26 may be stored in the memory 302 or the secondary storage 312. The input device 316 may include any device for entering data into the computer 300, such as a keyboard, keypad, cursor-control device, touch-screen (possibly with a stylus), or microphone. The display device 310 may include any type of device for presenting visual image, such as, for example, a computer monitor, flat-screen display, or display panel. The output device 308 may include any type of device for presenting data in hard copy format, such as a printer, and other types of output devices including speakers or any device for providing data in audio form. The computer 300 can possibly include multiple input devices, output devices, and display devices.

Although the computer 300 is depicted with various components, one skilled in the art will appreciate that the computer 300 can contain additional or different components. In addition, although aspects of an implementation consistent with the method for extending performance data collection for a SAN 10 are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling the computer 300 to perform a particular method.

While the present system and method have been described in connection with an exemplary embodiment, it will be understood that many modifications will be readily apparent to those skilled in the art, and this application is intended to cover any variations thereof. For example, the present system and method may be applied to software architectures other than storage area networks.

What is claimed is:

1. A system for extending performance data collection for a network, comprising: one or more devices corresponding to one or more device types; one or more data sources corresponding to the one or more devices, wherein the one or more data sources performing data collection from the one or more devices; an abstract data module operably connected with the one or more data sources; and a data collector coupled to the abstract data module that performances data collection from the one or more devices using the one or more data sources and the abstract data module, wherein the abstract data module comprises generic characteristics associated with the device types of the one or more devices, a data source comprises specific characteristics associated with the device type of the device corresponding to the data source and the specific characteristics of the data source are combined with the generic characteristics of the abstract data module to allow for performance data collection by the data collector from the device.

2. The system of claim 1, wherein each of the one or more data sources comprises a performance bean, wherein performance data for each device is transmitted from the device to the corresponding data source using the corresponding performance bean.

3. The system of claim 1, wherein each of the one or more data sources comprises a performance interface to initiate performance data collection from the one or more devices using the corresponding performance bean.

4. The system of claim 1, wherein the data collector is capable of receiving notifications corresponding to the device types of the one or more devices.

5. The system of claim 1, wherein the abstract data module comprises an interface between the one or more data sources and the abstract data module.

6. A method for extending performance data collection for a network, comprising the steps of: creating one or more data sources for one or more corresponding devices to be implemented into the network, wherein the one or more devices correspond to one or more device types; creating a complete implementation of the one or more data sources; and collecting performance data for the one or more devices using the complete implementation of the one or more data sources and further comprising implementing generic characteristics associated with the device types of the one or more devices into an abstract data module, wherein the step of creating one or more data sources comprises implementing specific characteristics associated with the device types of the one or more devices into the one or more data sources and creating a complete implementation of the one or more data sources comprises combining the specific characteristics of the one or more data sources with the generic characteristics of the abstract data module.

7. The method of claim 6, wherein the step of creating one or more data sources comprises creating one or more performance beans corresponding to the one or more data sources, wherein performance data for each device is transmitted from the device to the corresponding data source using the corresponding performance bean.

8. The method of claim 6, wherein the step of creating one or more data sources comprises creating a performance interface for each of the one or more data sources to initiate performance data collection from the one or more devices using the corresponding performance bean.

9. The method of claim 6, further comprising receiving notifications corresponding to the device types of the one or more devices.

10. A method for extending performance data collection for a network, comprising the steps of: identifying a device type of a device in the network; creating a data source corresponding to the device type of the device; creating a complete implementation of the data source; and collecting performance data from the device using the complete implementation of the data source, wherein the step of creating a data source comprises implementing specific characteristics associated with the device type of the device into the data source and creating a complete implementation comprises combining the specific characteristics of the data source with generic characteristics implemented into an abstract data module.

11. The method of claim 10, wherein the step of identifying comprises receiving a notification corresponding to the device type of the device.

12. The method of claim 10, wherein the step of creating a data source comprises creating a performance bean corresponding to the data source, wherein performance data for the device is transmitted from the device to the data source using the performance bean.

* * * * *

UNITED STATES PATENT AND TRADEMARK OFFICE
CERTIFICATE OF CORRECTION

PATENT NO. : 7,197,012 B2  Page 1 of 1
APPLICATION NO. : 10/284346
DATED : March 27, 2007
INVENTOR(S) : Jeremy Daggett It is certified that error appears in the above-identified patent and that said Letters Patent is hereby corrected as shown below:

On the face page, in field (73), in "Assignee", in column 1, line 1, after "Development" delete "," and insert -- Company, --, therefor.

Signed and Sealed this

Twenty-ninth Day of September, 2009

David J. Kappos
*Director of the United States Patent and Trademark Office*